United States Patent
Smithies (10) Patent No.: US 10,799,820 B2
(45) Date of Patent: Oct. 13, 2020

(54) DURABLE NANOFIBER SYNTHETIC FILTER MEDIA

(71) Applicant: NXTNANO, LLC, Lenexa, KS (US)

(72) Inventor: Alan Smithies, Overland Park, KS (US)

(73) Assignee: NXTANO, LLC, Lenexa, KS (US)

( * ) Notice: Subject to any disclaimer, the term of this patent is extended or adjusted under 35 U.S.C. 154(b) by 108 days.

(21) Appl. No.: 15/832,436

(22) Filed: Dec. 5, 2017

(65) Prior Publication Data
US 2019/0160404 A1 May 30, 2019

Related U.S. Application Data (63) Continuation-in-part of application No. 15/827,879, filed on Nov. 30, 2017, now abandoned.

(51) Int. Cl.
*B01D 39/00* (2006.01)
*B01D 39/16* (2006.01)
(Continued)

(52) U.S. Cl.
CPC ....... *B01D 39/163* (2013.01); *B01D 39/1623* (2013.01); *B32B 5/08* (2013.01); *B32B 27/286* (2013.01); *B32B 27/302* (2013.01); *B32B 27/304* (2013.01); *B32B 27/40* (2013.01); *B32B 37/06* (2013.01); *B32B 38/0036* (2013.01); *D01D 5/003* (2013.01); *D01F 6/44* (2013.01); *D01F 6/88* (2013.01); *B01D 46/546* (2013.01); *B01D 2239/025* (2013.01); *B01D 2239/0631* (2013.01); *B01D 2239/0654* (2013.01); *B01D 2239/1233* (2013.01); *B32B 2037/243* (2013.01); *B32B 2262/02* (2013.01);
(Continued)

(58) Field of Classification Search
CPC ....... B32B 5/08; B32B 27/286; B32B 27/302; B32B 27/304; B32B 27/40; B32B 37/06; B32B 2327/12; D01D 5/003; D01F 6/44; D01F 6/88; B01D 46/00; B01D 46/546; B01D 2239/025; B01D 2239/0631; B01D 2239/1233; B01D 39/00; B01D 39/163
USPC ......................................................... 55/528
See application file for complete search history.

(56) References Cited

U.S. PATENT DOCUMENTS 5,460,884 A * 10/1995 Kobylivker ............... D04H 3/16
428/373
2002/0021844 A1* 2/2002 Rusert ................... B65D 29/04
383/107
(Continued)

OTHER PUBLICATIONS

"The MERV Rating System for Air Filters," http://www.ontimeairfilters.com/air-filter-merv-rating (last visited Nov. 6, 2019). (Year: 2019).*
(Continued)

*Primary Examiner* — T. Bennett McKenzie
(74) *Attorney, Agent, or Firm* — Hovey Williams LLP (57) ABSTRACT

A present invention is directed to a laminated filtration media comprising a nanofiber coating applied onto a synthetic substrate. Generally, the laminated filtration media can be produced by applying the nanofiber layer onto the synthetic substrate via an electrospinning process and then thermo-mechanically bonding the nanofiber layer onto the synthetic substrate via a thermal bonding process. The laminated filtration media exhibits superior durability and can be used in a wide array of air filtration applications.

12 Claims, 5 Drawing Sheets

(51) Int. Cl.
*B32B 5/08* (2006.01)
*B32B 27/28* (2006.01)
*B32B 27/30* (2006.01)
*B32B 37/06* (2006.01)
*D01D 5/00* (2006.01)
*B32B 27/40* (2006.01)
*D01F 6/44* (2006.01)
*B32B 38/00* (2006.01)
*D01F 6/88* (2006.01)
*B01D 46/54* (2006.01)
*B32B 37/24* (2006.01)

(52) U.S. Cl.
CPC ....... *B32B 2305/38* (2013.01); *B32B 2309/02* (2013.01); *B32B 2327/12* (2013.01)

(56) References Cited

U.S. PATENT DOCUMENTS

| | | | | |
|---|---|---|---|---|
| 2010/0000411 A1* | 1/2010 | Wertz | ................ | B01D 39/1623 96/12 |
| 2011/0114554 A1* | 5/2011 | Li | ................ | B01D 39/1623 210/493.5 |
| 2011/0177395 A1* | 7/2011 | Kamisasa | ........... | D01D 5/0023 429/246 |
| 2011/0283671 A1* | 11/2011 | Soyama | ............ | B01D 39/2024 55/527 |
| 2012/0241391 A1* | 9/2012 | Carlson | ................. | D06M 13/21 210/808 |
| 2013/0288555 A1* | 10/2013 | Berkemann | ........ | B01D 39/1623 442/333 |
| 2014/0004349 A1* | 1/2014 | Buker | ................... | B29B 17/02 428/412 |
| 2014/0033663 A1* | 2/2014 | Jarrier | ................. | B01D 46/521 55/486 |
| 2014/0123613 A1* | 5/2014 | Le Port | ............... | B01D 39/163 55/524 |
| 2014/0322512 A1* | 10/2014 | Pham | ....................... | D01F 8/16 428/220 |
| 2014/0334998 A1* | 11/2014 | Wood | ..................... | B01D 53/02 423/210 |
| 2016/0051917 A1* | 2/2016 | Seeberger | .......... | B01D 46/0001 55/521 |
| 2016/0136560 A1* | 5/2016 | Gillilan | .................. | B01D 46/12 55/482 |
| 2018/0371656 A1* | 12/2018 | Yung | ..................... | D04H 1/4334 |
| 2019/0127885 A1* | 5/2019 | Amari | ...................... | D01F 1/02 |

OTHER PUBLICATIONS

Dahiya et al., "Spunbond Technology," file:///C:/Users/tmckenzie/Downloads/Dahiya%20et%20al,%20_Spunbond%20Technology_%20(2004)%20(1).pdf (2004) (last visited Mar. 5, 2020) (Year: 2004).*

* cited by examiner

DURABLE NANOFIBER SYNTHETIC FILTER MEDIA

RELATED APPLICATIONS

This application is a Continuation-in-Part of U.S. patent application Ser. No. 15/827,879, entitled "DURABLE NANOFIBER SYNTHETIC FILTER MEDIA," filed on Nov. 30, 2017, the entire disclosure of which is incorporated herein by reference.

BACKGROUND

1. Field of the Invention

The present invention generally relates to filtration media. More particularly, the present invention generally relates to filtration media comprising multicomponent nanofibers.

2. Description of the Related Art

There has been an increased emphasis on the use of nanofibers in filtration media. Typically, air filtration media comprising nanofibers must use a base or support substrate to support the nanofiber layer because the basis weight of the nanofibers is so light and the nanofibers are not self-supporting. For example, a commercial nanofiber coating or layer can have a basis weight ranging from 0.05 to 2.0 g/m² and may exhibit very little durability or inherent integral strength. Generally, most commercial filtration media incorporating nanofibers use a wet-laid base support formed from either pure cellulose or a cellulose/polyester blend. In such media, the nanofibers can be applied directly to the corrugated or grooved cellulose support and an acceptable solvent or polymer bond between the cellulose and the nanofiber can be formed, thereby rendering the nanofiber durable and functional for use.

Recently, there has been a growing need for more synthetic-based support media in filtration media. In particular, the industry has been focusing on synthetic support media such as polyester nonwovens, including the dry-laid, needlefelt, spunbond, wet-laid, and other forms of these nonwoven substrates. However, it has proven difficult to sufficiently bond nanofibers to these synthetic substrates and, therefore, alternative nanofiber bonding processes are being sought.

Applying synthetic nanofibers to synthetic base media or substrates for use in high performance dust or air filtration is relatively new. While there are several successful methods used to apply nanofibers to synthetic substrates, attaining the required level of bond or durability between the nanofibers and a synthetic substrate is a known and common industry problem. In contrast to applying nanofibers to a cellulose-based substrate, where there is a natural solvent-polymer bond between the cellulose substrate and the nanofiber, there is no natural bond between the nanofibers and a synthetic substrate. Therefore, alternate bonding processes are needed to attain the required durability and fiber bond strength.

Currently, alternative nanofiber bonding systems can include the use of an adhesive to bond the nanofiber to the synthetic substrate. However, the adhesive can block or clog the nanofiber nozzles or the spin holes used to spin the nanofibers, which results in process, quality, and productivity problems. Furthermore, given that the adhesive is not a component of the actual nanofiber polymer, the adhesive can interfere with attaining consistent and uniform nanofiber structure and shape, which is critical to the filtration performance.

Another existing bonding method incorporates the use of a secondary and expensive lightweight nonwoven structure or scrim support. In this case, the nanofiber is applied to a lightweight polyester nonwoven having a basis weight of about 20 to 30 gsm to thereby make a nanofiber composite layer. Generally, the lightweight nonwoven is a bicomponent-based spunbond or nonwoven. Afterwards, the nanofiber composite layer is applied to the main substrate in a secondary process, usually via a heat-pressure process. Unfortunately, this process uses two costly substrates and the nanofiber is never bonded sufficiently to the substrate. Furthermore, damage can occur to the substrates during the heating process.

Recently, electrospinning has been investigated as a method to apply nanofibers to a filtration media substrate. Generally, most electrospinning processes apply a single synthetic polymer to the chosen substrates. Exemplary electrospun nanofiber polymers found in the market today can include those produced from nylon or polyvinylidene fluoride ("PVDF"). However, conventional electrospinning methods can still form insufficient bonds between the nanofibers and the synthetic substrates.

Accordingly, there is a need for an improved method to bond a nanofiber layer onto a synthetic substrate.

SUMMARY

In one or more embodiments, the present invention generally concerns a laminate filter media. In such embodiments, the laminate filter media comprises: (a) a synthetic substrate and (b) a nanofiber layer at least partially coating a surface of the synthetic substrate. In such embodiments, the nanofiber layer comprises a nanofiber having an average diameter of less than 1,000 nm. Furthermore, the nanofiber comprises polymer A and polymer B, wherein polymer A and polymer B both comprise the same type of polymer. In addition, the melting point temperature of polymer A is higher than the melting point temperature of polymer B.

In one or more embodiments, the present invention generally concerns a nanofiber comprising polymer A and polymer B, wherein the nanofiber comprises an average diameter of less than 1,000 nm. In such embodiments, polymer A and polymer B may both comprise the same type of polymer and the melting point temperature of polymer A is higher than the melting point temperature of polymer B.

In one or more embodiments, the present invention generally concerns a method for producing a laminate filter media. Generally, the method comprises: (a) dissolving polymer A and polymer B in a solvent to form a spinning solution comprising a polymer solids content of 1 to 30 weight percent, wherein polymer A and polymer B both comprise the same type of polymer, polymer A exhibits melting point temperature A, polymer B exhibits melting point temperature B, and melting point temperature A is greater than melting point temperature B; (b) applying the spinning solution onto a synthetic substrate to thereby form an initial nanofiber layer on at least a portion of a surface of the substrate, wherein the initial nanofiber layer comprises a nanofiber having an average diameter of less than 1,000 nm; and (c) subjecting the initial nanofiber layer to a temperature that is less than the melting point temperature A and greater than the melting point temperature B to thereby thermo-mechanically bond the initial nanofiber layer onto the substrate and form a bonded nanofiber layer.

BRIEF DESCRIPTION OF THE FIGURES

Embodiments of the present invention are described herein with reference to the following drawing figures, wherein.

DETAILED DESCRIPTION

The present invention generally relates to a durable laminate filter media made from a novel and unique manufacturing process. The laminated filtration media of the present invention may be manufactured into a cartridge filter and be used in various industrial air filtration applications, including dust collection applications, gas turbine inlet applications, power generation applications, and automotive applications. As described herein, the present invention uses a combination of process steps including the electrospinning of nanofiber-sized fibers via a unique electrospinning production process and a secondary thermo-mechanical lamination process.

More particularly, the present invention provides a unique method for applying nanofibers directly to any synthetic substrate media and thermo-bonding the nanofiber to the base substrate without impairing the air permeability, filtration efficiency, and/or operating performance of the resulting filtration media. In fact, the method of the present invention can actually improve the in-use performance of the resulting filter media. In various embodiments, the method of the present invention uses a nanofiber with a dual melt point structure in the form of a multicomponent nanofiber. While not wishing to be bound by theory, it is believed that the combined use of a nanofiber having a dual melting point temperature and the specific thermal bonding system described herein allows the formation of desirable nanofiber coatings on synthetic substrates.

As discussed below in greater detail, the method of the present application generally involves: (1) electrospinning a nanofiber coating or layer onto a synthetic substrate and (2) thermo-mechanically bonding the nanofiber coating or layer onto the synthetic substrate. Each of these proposed steps are discussed in further detail below.

As discussed above, the nanofibers of the present invention can be formed and applied to the synthetic substrate via an electrospinning process. Generally, the base polymers in an electrospinning process for producing nanofibers, such as nylon or PVDF, must be soluble in a solvent or in an acid in preparation for fiber spinning. For example, nylon nanofibers are spun from a solution of nylon polymer dissolved in formic acid and PVDF nanofibers are spun from PVDF dissolved in dimethyl-acetamide or DMAc. Conventional electrospinning machinery known in the art may be used to carry out the electrospinning step.

In various embodiments, the electrospinning step of the present invention involves dissolving polymer A and polymer B in a dissolution solvent to form a spinning solution. Thus, the spinning solution can comprise, consist essentially of, or consist of polymer A, polymer B, and a dissolution solvent. In such embodiments, the melting point temperature of polymer A can be greater than the melting point temperature of polymer B.

In one or more embodiments, the dissolution solvent comprises formic acid, dimethylacetamide (DMAc), or dimethylformamide. In certain embodiments, the solvent comprises dimethylformamide. Generally, the spinning solution comprises a total solids contents of at least 1, 5, or 10 and/or not more than 50, 40, 30, or 20 weight percent as measured by the total weight of the solution.

A critical aspect of the present invention is that there are two different polymers selected and that each polymer has a different melting point (Tm) temperature.

In various embodiments, polymer A has a melting point temperature of at least about 120, 130, 140, 150, 160, 165, or 170° C. Additionally or alternatively, polymer A can have a melting point temperature of less than about 250, 225, or 200° C.

In various embodiments, polymer B has a melting point temperature of at least about 80, 90, 100, 110, or 120° C. Additionally or alternatively, polymer B can have a melting point temperature of less than about 190, 180, 170, 160, 150, 140, or 130° C.

In certain embodiments, polymer A and polymer B can both comprise the same type of polymer. As used herein, "both comprise the same type of polymer" means that polymer A and polymer B are polymers formed using the same type of monomers. For example, polymer A and polymer B can both be considered thermoplastic polyurethane polymers ("TPU"), such as thermoplastic polyester polyurethane ("PPU") polymers, that are formed from the same or similar types of PPU monomers. Consequently, both polymer A and polymer B would be considered PPU polymers and, therefore, would both comprise the same type of polymer in this exemplary embodiment. However, it should be noted that while polymer A and polymer B may comprise the same type of polymer, these polymers may exhibit different properties that commonly distinguish polymers of the same kind. For instance, polymer A and polymer B, despite being formed from the same or similar types of monomers, may comprise different degrees of polymerization, different molecular weights, different physical properties, different visual properties, and/or different chemical properties.

In various embodiments, polymer A and polymer B are thermoplastic polymers selected from the group consisting of thermoplastic polyurethanes (TPU) (e.g., polyester polyurethane (PPU)), polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene fluoride (PVDF), polyvinylidene chloride, polyvinyl butylene, polyacetal, polyamide, polyester, polyolefins, cellulose ethers, cellulose esters, polyalkylene sulfide, polyarylene oxide, polysulfone, modified polysulfone polymers, and combinations thereof.

In certain embodiments, the present invention uses thermoplastic polyurethane (TPU) polymers to produce the nanofibers. In other words, polymer A and polymer B would both comprise TPU polymers in such embodiments. Generally, the solvent used in the electrospinning step to render the TPU soluble is dimethylformamide. In one or more embodiments, the present invention uses TPU polymers that can be supplied by various suppliers such as BASF, Bayer, and DuPont. For example, the TPU polymers can include those made by Lubrizol under the brand name Estane®, with each polymer having a melt point of 120° C. and 170° C., respectively.

In certain embodiments, the present invention uses specific types of TPU polymers, such as thermoplastic polyester polyurethane (PPU) polymers, to produce the nanofibers. In other words, polymer A and polymer B would both comprise PPU polymers in such embodiments. Although not wishing to be bound by theory, the solvent used in the electrospinning step to render the PPU soluble is dimethylformamide. In one or more embodiments, the present invention uses PPU polymers that can be supplied by various suppliers such as BASF, Bayer, and DuPont. For example, the PPU polymers can include those made by Lubrizol under the brand name Estane®, with each polymer having a melt point of 120° C. and 170° C., respectively.

Next, the aforementioned spinning solution can be electrospun on at least one or more surfaces of a synthetic substrate. In such embodiments, the spinning solution can be coated on at least a portion of a surface of the substrate or on the entire surface of the substrate. More particularly, this step can involve applying the spinning solution onto a synthetic substrate to thereby form an initial nanofiber layer on at least a portion of a surface of the substrate. In such embodiments, the nanofiber layer comprises the above-referenced nanofibers.

As noted above, the nanofibers can be in the form of multicomponent fibers. More particularly, in various embodiments, the nanofibers can comprise, consist essentially of, or consist of polymer A and polymer B. In such embodiments, the nanofiber can comprise a weight percentage of polymer A that is greater than the weight percentage of polymer B. Alternatively, the nanofiber can comprise a weight percentage of polymer A that is less than the weight percentage of polymer B.

In various embodiments, the nanofiber can comprise at least 1, 5, 10, 20, 30, 40, 50, 60, 70, 80, or 85 weight percent of polymer A. Additionally or alternatively, the nanofiber can comprise less than 99, 95, 90, 85, 80, 75, 70, 65, 60, 55, or 50 weight percent of polymer A.

In various embodiments, the nanofiber can comprise at least 1, 5, 10, or 15 weight percent of polymer B. Additionally or alternatively, the nanofiber can comprise less than 50, 40, 30, or 20 weight percent of polymer B.

Additionally, the nanofibers coated on the synthetic substrate can comprise an average diameter of less than 1,000, 800, 600, 500, 400, 300, or 200 nm. Additionally or alternatively, the nanofibers coated on the synthetic substrate can have an average diameter of at least 1, 10, 50, 100, or 150 nm.

Although the formed nanofibers may be in the form of multicomponent fibers, the nanofibers may not comprise a defined cross-sectional shape for polymer A and polymer B (e.g., sheath/core, segmented pie, islands-in-sea, ribbon, etc.); rather, polymer A and polymer B are randomly positioned throughout the nanofibers in such embodiments. In such embodiments, the nanofibers may be considered random nanofibers. As used herein, "random nanofibers" refer to multicomponent fibers having no defined structural shape for the components contained therein. In certain embodiments, the nanofibers can have a substantially round cross-sectional shape.

In various embodiments, the nanofiber coated on the synthetic substrate can have an aspect ratio (i.e., length to diameter) of at least 10:1, 50:1, 100:1, 500:1 or 1,000:1.

It should be noted that the synthetic substrate can comprise any synthetic substrate known in the art. In various embodiments, the synthetic substrate can comprise polyester, polyamide, polyolefin, thermoplastic polyurethane, polyetherimide, polyphenyl ether, polyphenylene sulfide, polysulfone, aramid, polypropylene, or mixtures thereof. In certain embodiments, the synthetic substrate comprises polyester. Furthermore, the substrate can comprise a wet-laid, dry-laid, spunbond, or needlefelt substrate. In one or more embodiments, the synthetic substrate comprises a basis weight of at least 10, 50, or 70 gsm and/or not more than 500, 400, 300, or 260 gsm.

As noted above, using the above-referenced electrospinning process, the nanofibers can be applied to the base substrate via a roll-to-roll process. In a roll-to-roll process, a roll of substrate, which can include dry-laid, needle-felted, spunbond, or similar nonwovens, is fed through the electrospinning machine and the nanofibers are dispersed vertically down onto the substrate, thereby covering the substrate evenly and uniformly across the application zone. The bond between the nanofiber and the base substrate at this stage is a polymer bond only, which is strong enough for further processing but not strong enough for use in the end application.

Figure 1:
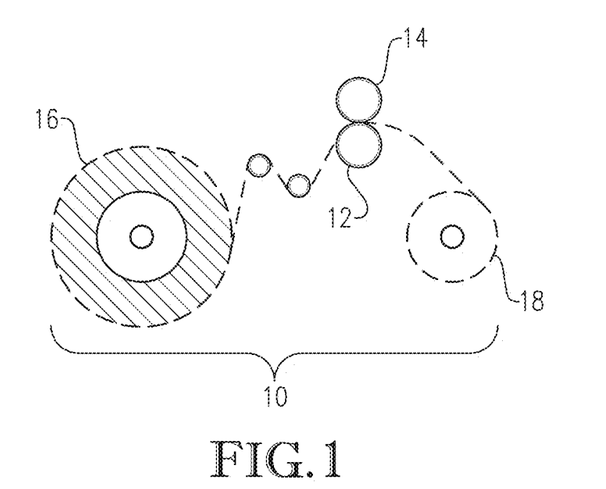
FIG. 1 depicts the thermal bonding method of the present invention.

The next step is to process the partially bonded media through a custom and unique thermal bonding process as depicted in FIG. 1. In order to optimize the nanofiber bond, the setup of the thermal lamination process is critical, along with the equipment design and configuration. As shown in FIG. 1, the lamination setup 10 incorporates a smooth steel hot roller 12 in combination with a rubber compressive nip roller 14.

Generally, the nip roller 14 is temperature controlled to cool and heat the nip roll 16 in order to maintain a constant temperature of at least 120, 130, or 135° C. and/or less than 200, 180, or 160° C. over extended periods of time, with the optimum temperature ranging from 138 to 148° C. The critical process temperature is provided by the hot roll 12, given the nanofiber surface will be exposed to the hot steel roll 12 surface. The resulting bonded roll 18 is removed from the presence of the steel hot roller 12 and nip roller 14.

To optimize bond and durability, the hot roll 12 temperature is set between the melting temperature of polymer A (e.g., a high melt TPU polymer, such as a PPU polymer) and the melting temperature of polymer B (e.g., a low melt TPU polymer, such as a PPU polymer). For example, if the melting point of polymer A is 170° C. and the melting temperature of polymer B is 120° C., then the ideal set point on the hot roll 12 would be about 145° C. Although not wishing to be bound by theory, this offset in melting temperature becomes critical as the lower melting point components in the nanofibers (i.e., the polymer B components) actually soften and bond to each other and to the base substrate; however, the high melting point components of the nanofibers (i.e., the polymer A components) remain unaffected and retain their dimension, consistency, and uniformity under the thermal and mechanical loading of the lamination process.

Figure 2:
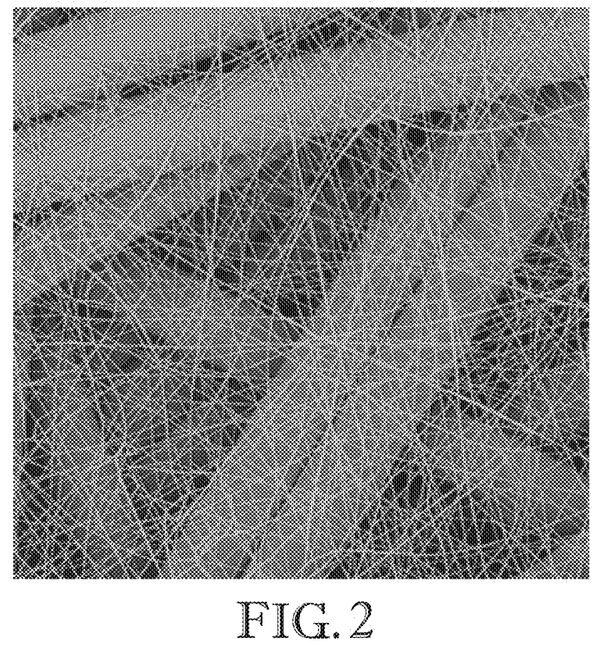
FIG. 2 is a micrograph of the nanofiber layer on a synthetic substrate prior to the thermal bonding step.
Figure 3:
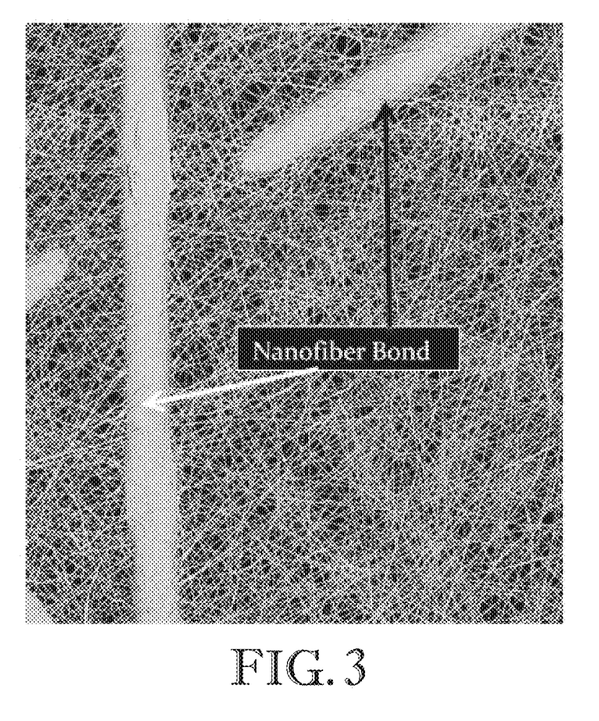
FIG. 3 is a micrograph of the nanofiber layer on a synthetic substrate after the thermal bonding step.

FIGS. 2 and 3 show the level of thermal bonding of the bicomponent nanofiber to the substrate both before and after lamination, respectively.

In various embodiments, the nanofiber layer on the resulting laminated filtration media can have a basis weight of at least 0.1 or 0.2 gsm and/or less than 5, 4, 3, 2, 1, or 0.5 gsm.

In various embodiments, the resulting laminated filtration media produced with the above-referenced process comprises a nanofiber surface coating of fine nanofibers applied to at least one side of an existing filter media. In such embodiments, the nanofiber coating improves the filtration efficiency and/or operating performance of the final filter. Furthermore, the long-term durability of the nanofibers being in position and operational allows the resulting filter to have a significantly longer operating life. Moreover, the filters produced by the inventive process will also operate longer and at a lower operating pressure drop. This lower operating pressure drop can have a significant commercial advantage in that the cost of cleaning air and the energy used to operate the system will be significantly reduced.

In various embodiments, the laminated filtration media of present invention can exhibit a filtration efficiency of MERV 11 to MERV 16 as measured according to the ASHRAE 52.2 2012 standard, a filtration efficiency of F7 to F9 as measured according to the EN779-2012 standard, and/or a filtration efficiency of E-10 to H-14 as measured according to the EN1882-2010 standard.

Figure 4:
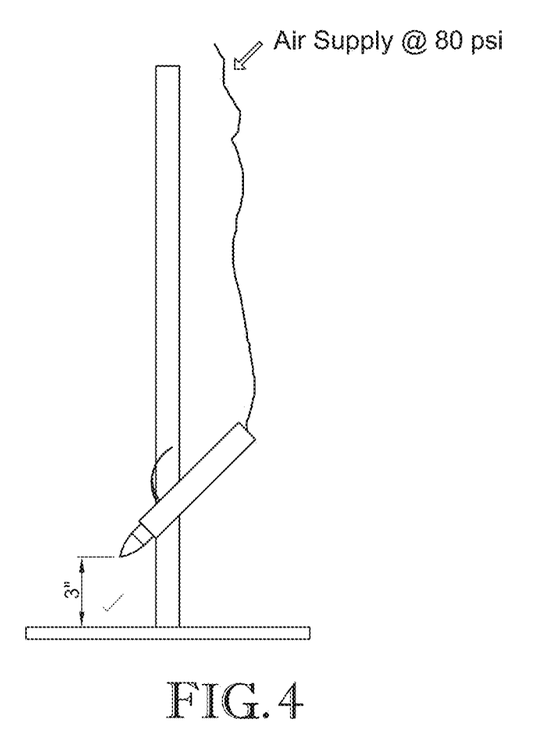
FIG. 4 depicts the air-knife configuration used to measure the bond durability of the nanofiber layer.

Additionally, in various embodiments, the nanofiber layer in the laminated filtration media exhibits a strong and durable bond that passes the Nanofiber Abrasion Test as measured using the air-knife configuration depicted in FIG. 4. During this test, the filtration media is placed on a level surface and the air-knife is angled at a 45-degree angle relative to the media and is spaced 3 inches from the media. The air-knife shoots out a stream of condensed air at about 80 psi towards the media. The Nanofiber Abrasion Test contains two steps: (1) the Initial Test and (2) the Abrasion Test.

During the Initial Test, the media is positioned so that the compressed air is applied once against the corrugation of the media and once with the corrugation of the media at 3 second intervals. After the tests, the media is inspected to observe the amount of peeling of the nanofiber layer from the substrate. The following ratings are provided based on these observations.

| Initial Test Ratings | |
|---|---|
| Rating | Property Description |
| 10 | No Peel |
| 9 | Sheet or peel less than 0.5 inch radius |
| 8 | Sheet or peel less than 1 inch radius |
| 7 | Sheet or peel less than 1.5 inch radius |
| 6 | Sheet or peel greater than 1.5 inch radius |
| 5 | Multidirectional sheeting narrower than 2 inches width |
| 4 | Lift and sheeting of membrane |

After the Initial Test, the media is then subjected to the Abrasion Test. During the Abrasion Test, the nanofiber layer is rubbed continuously in a 1 inch area and this same area is then positioned so that the compressed air is applied once against the corrugation of the media and once with the corrugation of the media at 3 second intervals. After the tests, the media is inspected to observe the amount of peeling of the nanofiber layer from the substrate. The following ratings are provided based on these observations.

| Abrasion Test Ratings | |
|---|---|
| Rating | Property Description |
| 10 | No Peel |
| 9 | Sheet or peel less than 0.5 inch radius |
| 8 | Sheet or peel less than 1 inch radius |
| 7 | Sheet or peel less than 1.5 inch radius |
| 6 | Sheet or peel greater than 1.5 inch radius |
| 5 | Multidirectional sheeting narrower than 2 inches width |
| 4 | Lift and sheeting of membrane |

The observed ratings from the Initial Test and Abrasion Test are combined and averaged. Generally, the nanofiber layer exhibits a strong and durable bond when the average test rating is at least 8. In various embodiments, the laminated filtration media exhibits an average test rating of at least 8, 9, or 10 as measured according to the Nanofiber Abrasion Test.

The filtration media produced in accordance with the present invention can be used in several applications. For example, the inventive filtration media may be used for air pollution control or in industrial dust collection processes. In such embodiments, the cartridge filters made from the new filter media are exposed to various, challenging dust-laden air streams coming off industrial process applications. The dirty air stream needs to be cleaned prior to exposure to the environment. Such filters also need to operate in a regenerative, cleaning mode, where the filters are cleaned constantly with high-pressure pulses of compressed air.

Additionally, the cartridge filters made from the new filtration media can be used to clean environmental air in readiness for the combustion process, as found in a gas turbine inlet system for power generation applications. Again, to ensure cost effective operating performance, the filters need to be cleaned via high-pulsed compressed air; hence, the nanofiber bond must be durable and strong to survive the life expected from the filters.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

An abrasion test to define and measure the production quality of the high durability filtration media was developed and tested on the inventive laminated filtration media. The inventive filters were made with TPU polymers and tested under real time simulation testing. For this example, a high melt TPU polymer (Tm of 170° C.) and a low melt TPU polymer (Tm of 120° C.) were dissolved in dimethylformamide and coated onto a polyester substrate via an electrospinning process to produce an initial nanofiber layer on the substrate. Both TPU polymers were commercial polymers available under the brand name Estane® by Lubrizol. Subsequently, the applied nanofiber layer was thermally bonded onto the substrate using the nip roller configuration depicted in FIG. 1.

Figure 5:
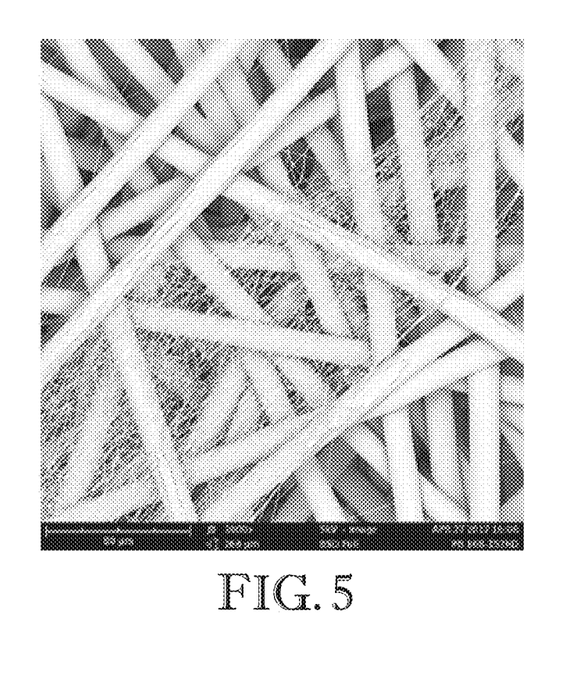
FIG. 5 is a micrograph of air-knife testing of a nanofiber layer on a synthetic substrate prior to the thermal bonding step.
Figure 6:
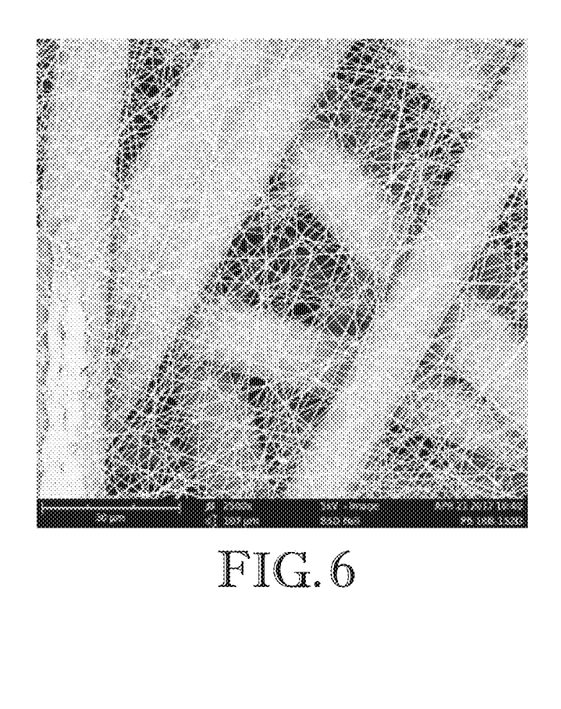
FIG. 6 is a micrograph of air-knife testing of a nanofiber layer on a synthetic substrate after the thermal bonding step.

The test used to measure bond durability of the laminated filtration media used the air-knife configuration as depicted in FIG. 4. Using the air-knife, a stream of compressed air was directed at the laminated nanofiber media for about 10 seconds. The compressed air was at about 85 psi and the distance between the air-knife and the laminated filtration media was about 6 inches at a 45-degree angle. The air-knife was positioned to try to "break" or "lift" the bonded nanofiber from the substrate. FIGS. 5 and 6 depict scanning electron micrographs of the nanofiber air-knife testing both before and after thermal lamination, respectively.

The filter testing also involved loading the filters on a test fixture that simulated a gas turbine intake system and exposing the filters to heavy loadings of dust, high air flow velocities, compressed pulsed air cleaning cycles, and high, sustained pressure drop.

The exemplary filtration media was tested for over 30,000 pulse clean cycles, where the filters were cleaned by a high-pressure pulse of compressed air from the clean side that blasted off the dust from the dirty side. This pulse cleaning puts the most strain on the nanofiber-to-substrate bond. The abrasion of the dust and air velocities also applied a strain on bond durability. Furthermore, 30,000 cleaning pulse cycles can represent about 12 months of operation life of a gas turbine inlet filter or about 50% of its guaranteed life.

Figure 7:
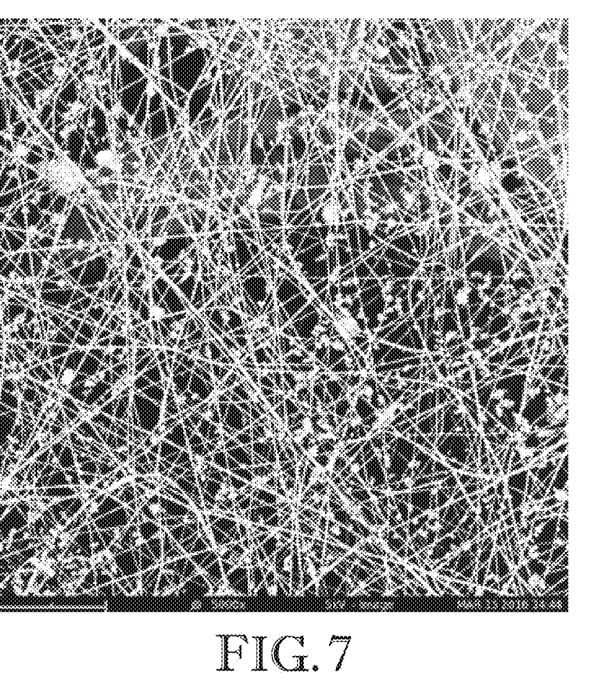
FIG. 7 is a micrograph depicting a filtration media of the present invention that has been subjected to air filtration testing as described in Example 1.
Figure 8:
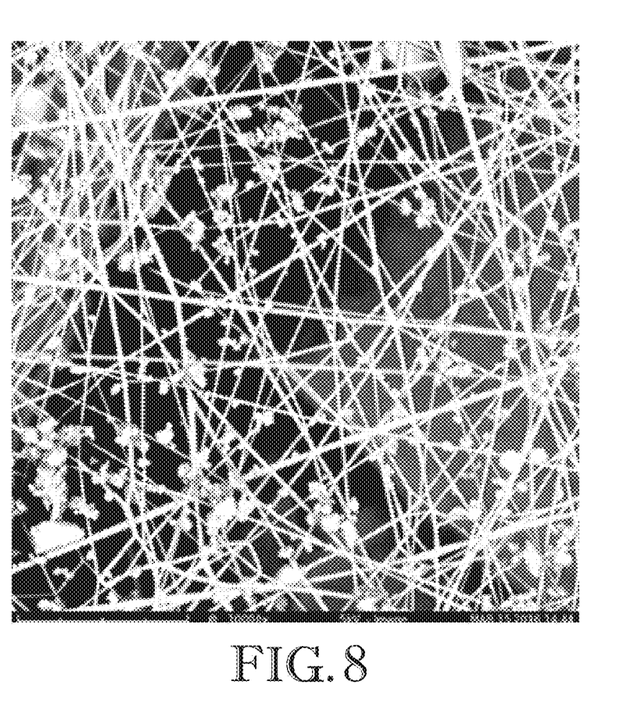
FIG. 8 is a micrograph depicting a filtration media of the present invention that has been subjected to air filtration testing as described in Example 1.

FIGS. 7 and 8 depict scanning electron micrographs of the inventive filtration media after being exposed to the simulation test conditions as noted above. The inventive filtration media was cut and removed from the tested filter and treated with a light surface vacuum to remove the excess dust prior to the SEM's being developed. FIGS. 7 and 8 show the good condition of the high durability nanofiber after extensive simulation testing.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A laminate filter media, said laminate filter media comprising:
    (a) a synthetic substrate; and
    (b) a nanofiber layer at least partially coating a surface of said synthetic substrate,
    wherein said nanofiber layer comprises a random nanofiber having an average diameter of 10 nm to 1,000 nm, and
    wherein said random nanofiber comprises polymer A and polymer B, said polymer A and said polymer B both comprise the same type of polymer, and said polymer A has a higher melting point temperature than said polymer B,
    wherein said polymer A exhibits a melting point temperature in the range of 150 to 250° C. and said polymer B exhibits a melting point temperature in the range of 80 to 150° C., and
    wherein the weight percentage of said polymer A in said random nanofiber is greater than the weight percentage of said polymer B in said random nanofiber.

2. The laminate filter media according to claim 1, wherein said polymer A and said polymer B comprise at least one polymer selected from the group consisting of thermoplastic polyurethane (TPU), polyacrylonitrile, polyvinylidene fluoride (PVDF), polysulfone polymers, or polystyrene polymers.

3. The laminate filter media according to claim 1, wherein said random nanofiber comprises an electrospun nanofiber.

4. The laminate filter media according to claim 3, wherein said polymer A and said polymer B comprise thermoplastic polyurethane (TPU).

5. The laminate filter media of claim 1, wherein said synthetic substrate comprises at least one material selected from the group consisting of polyester, polyamide, polyolefin, thermoplastic polyurethane, polyetherimide, polyphenyl ether, polyphenylene sulfide, polysulfone, aramid, polypropylene, or mixtures thereof.

6. The laminate filter media according to claim 1, wherein said laminate filter media exhibits a filtration efficiency of at least MERV 11 as measured according to the ASHRAE 52.2 2012 standard.

7. The laminate filter media according to claim 1, wherein said nanofiber layer comprises a basis weight of 0.1 to 5 gsm.

8. The laminate filter media according to claim 1, wherein said random nanofiber has an average diameter of 10 nm to 400 nm.

9. A method for producing a laminate filter media, said method comprising:
(a) dissolving polymer A and polymer B in a solvent to form a spinning solution comprising a polymer solids content of 1 to 30 weight percent, wherein said polymer A and said polymer B both comprise the same type of polymer, said polymer A exhibits melting point temperature A and said polymer B exhibits melting point temperature B, and said melting point temperature A is greater than said melting point temperature B;
(b) applying said spinning solution onto a synthetic substrate to thereby form an initial nanofiber layer on at least a portion of a surface of said substrate, wherein said initial nanofiber layer comprises a random nanofiber having an average diameter of 10 nm to 1,000 nm; and
(c) subjecting said initial nanofiber layer to a temperature that is less than said melting point temperature A and greater than said melting point temperature B to thereby thermo-mechanically bond the initial nanofiber layer onto the substrate and form a bonded nanofiber layer,
wherein said melting point temperature A is in the range of 150 to 250° C.,
wherein said melting point temperature B is in the range of 80 to 150° C., and
wherein the weight percentage of said polymer A in said random nanofiber is greater than the weight percentage of said polymer B in said random nanofiber.

10. The method according to claim 9, wherein said polymer A and said polymer B comprise at least one polymer selected from the group consisting of thermoplastic polyurethane (TPU), polyacrylonitrile, polyvinylidene fluoride (PVDF), polysulfone polymers, or polystyrene polymers.

11. The method according to claim 9, wherein said solvent comprises at least one solvent selected from the group consisting of formic acid, dimethylacetamide (DMAc), or dimethylformamide.

12. The method according to claim 11, wherein said applying of step (b) comprises electrospinning said spinning solution onto said substrate.

* * * * *